(12) United States Patent
Coles et al.

(10) Patent No.: US 11,720,836 B1
(45) Date of Patent: Aug. 8, 2023

(54) SYSTEMS AND METHODS FOR FACILITATING SECURE DUAL CUSTODY ACTIVITIES

(71) Applicant: WELLS FARGO BANK, N.A., San Francisco, CA (US)

(72) Inventors: Nathan Coles, San Francisco, CA (US); Darren M. Goetz, San Francisco, CA (US); Uma Meyyappan, San Francisco, CA (US); Dennis Montenegro, San Francisco, CA (US); Steve Perez, San Francisco, CA (US); Debarchana Roy, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 128 days.

(21) Appl. No.: 16/942,595

(22) Filed: Jul. 29, 2020

(51) Int. Cl.
| | |
|---|---|
| *G06Q 10/00* | (2023.01) |
| *G06Q 10/0631* | (2023.01) |
| *G06N 20/00* | (2019.01) |
| *G06N 5/04* | (2023.01) |
| *G06Q 10/0639* | (2023.01) |

(Continued)

(52) U.S. Cl.
CPC ....... *G06Q 10/063114* (2013.01); *G06N 5/04* (2013.01); *G06N 20/00* (2019.01); *G06Q 10/06316* (2013.01); *G06Q 10/06398* (2013.01); *G06Q 10/063112* (2013.01); *G06Q 10/105* (2013.01); *G06Q 30/0185* (2013.01); *G06T 11/00* (2013.01); *G06F 3/04847* (2013.01)

(58) Field of Classification Search
CPC ............. G06Q 30/0185; G06Q 10/063; G06Q 10/0631; G06Q 10/06311; G06Q 10/063114; G06Q 10/063112; G06Q 10/06316; G06Q 10/0639; G06Q 10/06398; G06Q 10/105
See application file for complete search history.

(56) References Cited

U.S. PATENT DOCUMENTS

| | | |
|---|---|---|
| 6,567,784 B2 | 5/2003 | Bukow |
| 7,143,066 B2 | 11/2006 | Shear et al. |

(Continued)

OTHER PUBLICATIONS

Watson, S. T. (2015). Impostor fraud: A cyber risk management challenge. Treasury & Risk. Breaking News. (Year: 2015).*

*Primary Examiner* — William S Brockington, III
(74) *Attorney, Agent, or Firm* — Foley & Lardner LLP

(57) ABSTRACT

Systems, methods, and apparatuses for securely completing a dual custody activity are described herein. A security activity management system comprises a network, an employee device, a supervising employee device, and a provider computing system. The provider computing system is associated with a provider. The provider computing system comprises a processing circuit structured to identify a plurality of employees eligible for performing a task based employee rankings of the plurality of employees and transmit an indication of the plurality of employees eligible for performing the task to a supervising employee via an augmented reality to be displayed on the supervising employee device. The processing circuit is further structured to receive a selection indicating an employee that is associated with the employee device to perform the dual custody activity, authorize the employee to perform the task, and monitor the employee while the employee performs the task.

19 Claims, 6 Drawing Sheets

(51) Int. Cl.
  *G06Q 30/018* (2023.01)
  *G06T 11/00* (2006.01)
  *G06Q 10/105* (2023.01)
  *G06F 3/04847* (2022.01)

(56) References Cited

U.S. PATENT DOCUMENTS

| | | |
|---|---|---|
| 9,934,477 B1 * | 4/2018 | Hansen ............... G06F 11/0793 |
| 10,002,334 B1 | 6/2018 | Ross et al. |
| 10,122,859 B2 | 11/2018 | D'Arcy et al. |
| 10,237,420 B1 | 3/2019 | Wu et al. |
| 10,445,963 B2 | 10/2019 | Brandwijk |
| 2008/0244605 A1 | 10/2008 | Bennington et al. |
| 2008/0300953 A1 | 12/2008 | Sarlay |
| 2009/0249433 A1 * | 10/2009 | Misra .................. H04L 63/1416 |
| | | 726/1 |
| 2011/0153379 A1 | 6/2011 | Toba et al. |
| 2013/0275321 A1 | 10/2013 | Chuang |
| 2014/0310595 A1 * | 10/2014 | Acharya ............. G06F 3/04842 |
| | | 715/706 |
| 2015/0195406 A1 * | 7/2015 | Dwyer .................. G06F 40/279 |
| | | 379/265.07 |
| 2016/0098681 A1 | 4/2016 | Canis et al. |
| 2016/0104096 A1 | 4/2016 | Ovick et al. |
| 2017/0024681 A1 | 1/2017 | Singh et al. |
| 2017/0099200 A1 * | 4/2017 | Ellenbogen ............ G06N 5/022 |
| 2017/0220972 A1 | 8/2017 | Conway |
| 2018/0025309 A1 | 1/2018 | Absher et al. |
| 2019/0236512 A1 | 8/2019 | Lee |
| 2019/0244176 A1 | 8/2019 | Chuang et al. |
| 2020/0327910 A1 * | 10/2020 | Khan ..................... G11B 27/10 |

* cited by examiner

SYSTEMS AND METHODS FOR FACILITATING SECURE DUAL CUSTODY ACTIVITIES

TECHNICAL FIELD

The present application relates to facilitating secure employee activities. More particularly, the present application relates to systems and methods for allowing for real-time monitoring of and provision of instructions and/or feedback to employees performing various employee activities.

BACKGROUND

Some entities may perform a variety of sensitive and/or high-risk tasks or activities. In some instances, these activities may require "dual custody" (e.g., have various tasks that need to be completed by multiple people at the same time for security reasons). However, in some instances dual custody activities can still be subject to fraud or theft because, for example, there may be collusion between parties performing the given dual custody activity and/or a supervisory-level employee (e.g., a manager, a district manager) may purposefully select an individual to participate in the dual custody activity that the supervisory-level employee knows will not pay close attention during the activity, thereby making theft by the supervisory-level employee easy. Accordingly, there are a variety of concerns associated with current methods and systems for performing these types of sensitive and/or high-risk tasks or activities.

SUMMARY

One example embodiment relates to a secure activity management system comprising a network, an employee device, a supervising employee device, and a provider computing system. The employee device is associated with an employee of a provider. The supervising employee device is associated with a supervising employee of the provider. The provider computing system is associated with the provider and is configured to communicate with the employee device and the supervising employee device via the network. The provider computing system comprises a processing circuit including a processor and a memory. The processing circuit is structured to receive an activity initiation trigger including an employee activity indicator. The processing circuit is further structured to determine a dual custody activity based on the employee activity indicator. The processing circuit is further structured to identify a task for completion of the dual custody activity. The processing circuit is further structured to identify a plurality of employees eligible for performing the task based on employee rankings of the plurality of employees. The processing circuit is further structured to transmit an indication of the plurality of employees eligible for performing the task to the supervising employee via an augmented reality overlay to be displayed on the supervising employee device. The processing circuit is further structured to receive a selection from the supervising employee device, the selection indicating the employee that is to perform the dual custody activity. The processing circuit is further structured to authorize the employee to perform the task.

Another example embodiment relates to a secure activity management system comprising a network, an employee device, and a provider computing system. The employee device is associated with an employee of a provider. The provider computing system is associated with the provider and is configured to communicate with the employee device via the network. The provider computing system comprises a processing circuit including a processor and a memory. The processing circuit is structured to receive an activity initiation trigger including an employee activity indicator. The processing circuit is further structured to determine a dual custody activity based on the employee activity indicator. The processing circuit is further structured to identify a task for completion of the dual custody activity. The processing circuit is further structured to identify the employee to perform the task based on an employee ranking of the employee. The processing circuit is further structured to authorize the employee to perform the task. The processing circuit is further structured to monitor the employee while the employee performs the task. Monitoring the employee comprises providing real-time instructions to the employee device associated with the employee while the employee performs the task. Monitoring the employee further comprises receiving monitoring information pertaining to the employee performing the task while the employee performs the task.

Another example embodiment relates to a secure activity management system comprising a network, an employee device, and a provider computing system. The employee device is associated with an employee of a provider. The provider computing system is associated with the provider and is configured to communicate with the employee device via the network. The provider computing system comprises a processing circuit including a processor and a memory. The processing circuit is structured to receive an activity initiation trigger including an employee activity indicator. The processing circuit is further structured to determine an employee activity based on the employee activity indicator. The processing circuit is further structured to identify task for completion of the employee activity. The processing circuit is further structured to identify the employee to perform the task based on an employee ranking of the employee. The processing circuit is further structured to authorize the employee to perform the task. The processing circuit is further structured to monitor the employee while the employee performs the task. Monitoring the employee comprises providing real-time instructions to the employee device via an augmented reality (AR) overlay to be displayed on the employee device while the employee performs the task. Monitoring the employee further comprises receiving monitoring information pertaining to the employee performing the task while the employee performs the task.

These and other features, together with the organization and manner of operation thereof, will become apparent from the following detailed description when taken in conjunction with the accompanying drawings.

DETAILED DESCRIPTION

Figure 1:
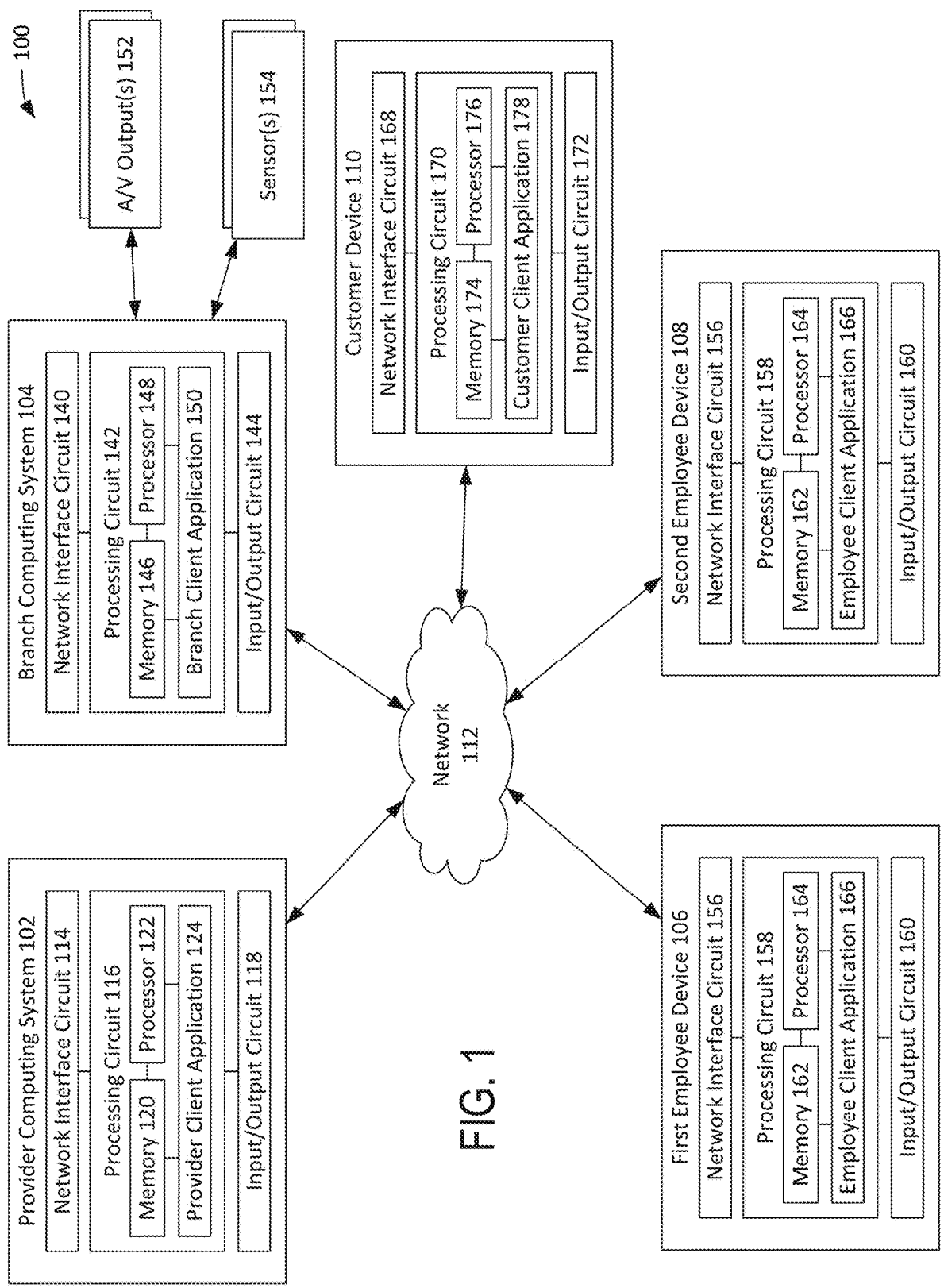
FIG. 1 is a diagram of a secure activity management system, according to an example embodiment.

Referring generally to the figures, systems and methods for facilitating secure performance of employee activities are shown and described. Specifically, the systems and methods described herein facilitate the identification of various employees for performing requested employee activities. In some instances, this may comprise identifying a pair of employees to perform a dual custody activity. For example, the dual custody activity may comprise various cash value activities, safety deposit box activities, activities relating to an armored car picking up or dropping off cash, and/or various other sensitive or high-risk activities. Upon identifying the pair of employees, the identified employees may then be authorized to perform the given employee activity. For example, in some instances, the identified employees may receive physical or virtual keys configured to enable access to various areas and/or materials necessary for the given employee activity.

The systems and methods described herein further allow for real-time monitoring of the identified employees while they are performing the employee activity. Accordingly, while the identified employees are performing the employee activity, suspicious, incorrect, and/or inappropriate activities may be flagged, and the appropriate supervisory-level employees may be notified. Furthermore, the identified employees may receive real-time instructions and/or feedback pertaining to the employee activity while it is being performed (e.g., via an augmented reality overlay).

The embodiments of the secure activity management system and associated client applications described herein improve current activity security systems by randomizing pairings of employees selected to perform sensitive and/or high-risk activities, thereby reducing the likelihood of collusion and/or a supervisory-level employee purposefully selecting an employee they know to be negligent to allow the supervisory-level employee to steal or commit other nefarious behavior without detection. Further, the systems and methods described herein further improve current activity systems by utilizing an employee ranking to identify employees to perform sensitive and/or high-risk activities. The employee ranking may be based on a variety of factors, such as employee trustworthiness, employee experience, employee job title, employee training history, and/or any other suitable employee characteristics deemed relevant for a particular employee activity.

Additionally, the systems and methods described herein improve the prevention of theft and/or losses occurring while various tasks are performed by allowing for providers to interactively monitor (e.g., automatically or via a second party using an associated device) identified employees while they are performing the sensitive and/or high-risk activities. Furthermore, the systems and methods described herein are configured to automatically flag suspicious behavior while interactively monitoring the employees, thereby improving the security of the given employee activity and effectively preventing collusion, theft, or other nefarious behavior from taking place.

The systems and methods described herein additionally improve the transparency between provider employees, branch managers, district managers, and various branch employees. For example, all interested parties (local and remote) can simultaneously view the identified employees' actions while performing a given employee activity. Accordingly, all interested parties may be apprised of the identified employees' actions throughout the process of completing a given employee activity. Further, the employees' actions may be recorded and viewed after the given employee activity, thereby allowing for improved dispute resolution in the case that currency or other valuables go missing during the given employee activity. Additionally, because the employees' actions can be viewed from a remote location (e.g., at a centralized security review center), the potential for collusion between employees who know each other or otherwise have a personal relationship is greatly reduced.

Referring now to FIG. 1, a block diagram of a secure activity management system 100 is shown, according to an example embodiment. The secure activity management system 100 includes, among other systems, a provider computing system 102, a branch computing system 104, a first employee device 106, a second employee device 108, and a customer device 110. The provider computing system 102, the branch computing system 104, the first employee device 106, the second employee device 108, and the customer device 110 may communicate directly or through a network 112, which may include one or more of the Internet, cellular network, Wi-Fi, Wi-Max, a proprietary banking network, a proprietary retail or service provider network, or any other type of wired or wireless network.

The provider computing system 102 may be managed by a provider, such as a credit card issuer, a bank, a retailer, a service provider, or the like. The provider computing system 102 includes a network interface circuit 114, a processing circuit 116, and an input/output circuit 118. The network interface circuit 114 is structured and used to establish connections with other computing systems and devices (e.g., the branch computing system 104, the first employee device 106, the second employee device 108, and the customer device 110) by way of the network 112. The network interface circuit 114 includes program logic that facilitates connection of the provider computing system 102 to the network 112.

For example, the network interface circuit 114 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 114 includes the hardware and machine-readable media sufficient to support communication over multiple channels of data communication. Further, in some arrangements, the network interface circuit 114 includes cryptography capabilities to establish a secure or relatively secure communication session in which data communicated over the session is encrypted.

The processing circuit 116 includes a memory 120, a processor 122, and a provider client application 124. The memory 120 may be one or more devices (e.g., RAM, ROM, Flash memory, hard disk storage) for storing data and/or computer code for completing and/or facilitating the various processes described herein. Memory 120 may be or include non-transient volatile memory, non-volatile memory, and non-transitory computer storage media. Memory 120 may include database components, object code components, script components, or any other type of information structure for supporting the various activities and information structures described herein. Memory 120 may be communicably coupled to the processor 122 and include computer code or instructions for executing one or more processes described herein. The processor 122 may be implemented as one or more application specific integrated circuits (ASICs), field programmable gate arrays (FPGAs), a group of processing components, or other suitable electronic processing components. As such, the provider computing system 102 is configured to run a variety of application programs and store associated data in a database of the memory 120. One such application may be the provider client application 124.

The provider client application 124 is structured to provide displays to the provider computing system 102 to allow for a provider employee (e.g., a centralize security review center employee) to oversee or otherwise interact with or intervene in various activities performed by employees to provide improved security. Specifically, the provider client application 124 is configured to communicate with the branch computing system 104, the first employee device 106, the second employee device 108, and the customer device 110 to receive employee activity requests, provide task instructions associated with the requested employee activity, identify appropriate employees for performing the tasks associated with the requested employee activity, provide authorization to the identified employees, receive monitoring information and provide real-time feedback to and/or from the identified employees before, during, and/or after performing the tasks associated with the requested employee activity, and update various employee rankings based on a variety of factors. Accordingly, the provider client application 124 is communicably coupled to the branch computing system 104, the first employee device 106, the second employee device 108, and the customer devices 110.

The provider client application 124 may thus communicate with the branch computing system 104, the first employee device 106, the second employee device 108, and the customer devices 110 to perform a variety of functions. For example, as will be described herein, the provider client application 124 is configured to allow for automatic and/or selective identification of appropriate employees for various employee activities (e.g., dual custody activities). In some instances, the provider client application 124 is further configured to allow for the automatic matching or pairing of appropriate employees for dual custody activities.

As used herein, the term "dual custody activities" is used to mean any activity performed by employees that either requires or is strongly encouraged to have two or more employees perform the activity or various tasks associated with the activity together (e.g., to provide additional security). Accordingly, in some instances, a dual custody activity may be an activity that requires two or more employees to perform a set of tasks that may only be performed together. For example, dual custody activities may comprise cash value activities, safety deposit box activities, activities relating to an armored car picking up or dropping off cash, and/or any other activities that may necessitate two or more employees performing various tasks together. Some dual custody activities are required to be performed by two or more employees because of a provider requirement.

In some instances, the provider client application 124 is configured to match employees based on various employee characteristics. One of these characteristics may be an employee ranking. As will be described further herein, the employee ranking may be based on a variety of factors, such as employee trustworthiness, employee experience, employee job title, employee training history, and/or any other suitable employee characteristics deemed relevant for a particular employee activity.

In some instances, various employee activities (e.g., dual custody activities) may require authorization. As such, the various employee activities may require the use of various authorization keys. For example, in some instances, dual custody activities may require the use of a dual set of keys, such as a lower key held by a lower-level employee (e.g., a banker or a teller) and an upper key held by a supervisory-level employee (e.g., a branch manager). In some instances, various employee activities may further require signatures and/or dual signing. Accordingly, the displays presented to the user via the provider client application 124 may provide various interfaces allowing for the transfer of authorization keys and the input of various signatures by employees associated with the provider computing system 102.

Furthermore, the provider client application 124 may be configured to interactively monitor the identified employees before, during, and/or after they perform the various tasks associated with the requested employee activity. For example, the provider client application 124 may be configured to transmit various instructions to the employees (e.g., the branch computing system 104, the first employee device 106, the second employee device 108). In some instances, the provider client application 124 is further configured to receive various real-time monitoring information (e.g., audio data, video data, physiological sensor data, thermal imaging data) from the employees (e.g., via the branch computing system 104, the first employee device 106, the second employee device 108) before, during, and/or after they perform the various tasks associated with the requested employee activity. The provider client application 124 may thus monitor the employees to ensure that the employees are performing the various tasks correctly and that nothing suspicious is taking place. Then, based on the monitoring information, the provider client application 124 may further be configured to update the employee ranking.

In some embodiments, the provider client application 124 may be incorporated with an existing application in use by the provider computing system 102 (e.g., a mobile banking application, a service provider application, etc.). In other embodiments, the provider client application 124 is a separate software application implemented on the provider computing system 102. The provider client application 124 may be downloaded by the provider computing system 102 prior to its usage, hard coded into the memory 120 of the provider computing system 102, or be a network-based or web-based interface application such that the provider computing system 102 may provide a web browser to access the application, which may be executed remotely from the provider computing system 102. Accordingly, the provider computing system 102 may include software and/or hardware capable of implementing a network-based or web-based application. For example, in some instances, the provider client application 124 includes software such as HTML, XML, WML, SGML, PHP (Hypertext Preprocessor), CGI, and like languages.

In the latter instance, the user (e.g., a provider employee) may have to log onto or access the web-based interface before usage of the application. Further, and in this regard, the provider client application 124 may be supported by a separate computing system including one or more servers, processors, network interface circuits, etc. that transmit applications for use to the provider computing system 102.

Further, in some instances, the provider client application 124 may require authentication of the user prior to its usage. For example, the provider client application 124 may require the user to enter a password, a personal identification number (PIN), to scan their fingerprint, to be verified via facial recognition, to be verified via voice recognition, and/or to be authenticated by any other suitable authentication methods.

In certain embodiments, the provider client application 124 includes an application programming interface (API) and/or a software development kit (SDK) that facilitate the integration of other applications with the provider client application 124. In some embodiments, the provider client application 124 is configured to utilize the functionality and/or data stored within various external systems through an API. For example, in some instances, the provider client application 124 is configured to access external systems having databases storing large quantities of training data that may be used to train various artificial intelligence (AI) models employed by the provider computing system 102 to aid in the identification of suspicious behavior while monitoring the employees performing the various tasks associated with given requested employee activities.

Figure 2:
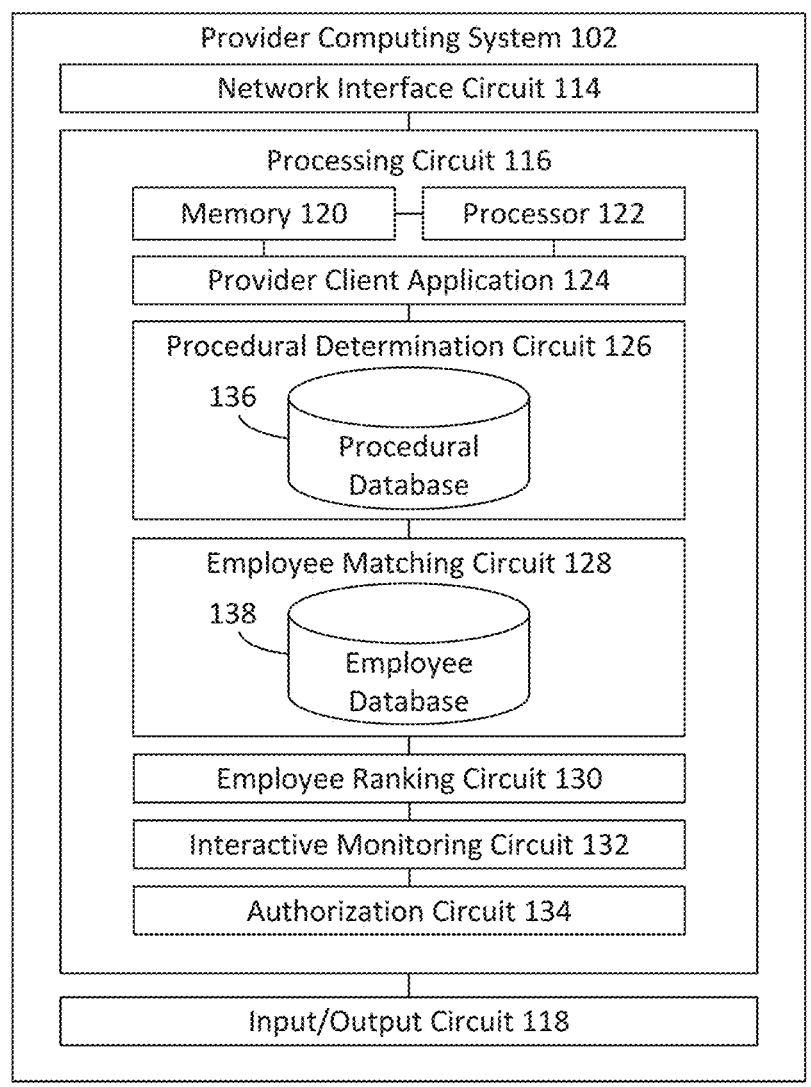
FIG. 2 is a diagram of a provider computing system of the secure activity management system of FIG. 1, according to an example embodiment.

Referring now to FIG. 2, in some instances, the processing circuit 116 further includes a procedural determination circuit 126, an employee matching circuit 128, an employee ranking circuit 130, an interactive monitoring circuit 132, and an authorization circuit 134. The procedural determination circuit 126 is structured to receive an employee activity indicator from the provider client application 124 and to determine various procedural information associated with completing the corresponding employee activity (e.g., a dual custody activity). For example, in some instances, the procedural determination circuit 126 includes a procedural database 136. The procedural database 136 is structured to retrievably store procedural information pertaining to a variety of potential employee activities. For example, the procedural information may include a list of tasks associated with each employee activity, a corresponding list of task requirements or job standards associated with each of the identified tasks, and a set of instructions for performing each of the identified tasks. In some instances, the job standards for a particular employee activity may be based on historical data related to that employee activity. For example, a task associated with an employee activity may historically take a certain amount of time. Accordingly, the procedural database 136 may set an allotted time for the identified employee to complete that task based on how long it has historically taken employees to complete that task.

The employee matching circuit 128 is structured to receive the list of tasks identified by the procedural determination circuit 126, as well as the corresponding list of task requirements associated with each of the identified tasks, and identify or match one or more employees that would be appropriate for completing each of the various tasks. In some instances, the employee matching circuit 128 may identify a plurality of employees capable of or eligible for performing each of the various tasks. The employee matching circuit 128 may then transmit an indication (e.g., a list, an augmented reality overlay) to a supervising employee device (e.g., the first employee device 106, the second employee device 108, or any other suitable supervising employee device) associated with the branch computing system 104 or the provider computing system 102. The employee matching circuit 128 may then receive a selection from a supervising employee of which employees they would like to perform the employee activity. In some instances, the employee matching circuit 128 includes an employee database 138. The employee database 138 is structured to retrievably store various information pertaining to employees associated with the provider. For example, the employee database 138 may retrievably store an employee location, an employee experience level, an employee efficiency score, employee availability, an employee Gallup rating, an employee cash handling approval limit (e.g., the employee is approved to handle cash amounts of up to $50,000), an employee training history, and/or any other pertinent information pertaining to each employee. In some instances, the employee database 138 may further retrievably store an employee ranking for each employee. The employee ranking may be determined by the employee ranking circuit 130, as will be discussed below.

In some instances, the employee matching circuit 128 may further be configured to identify and/or match employees to various tasks based on a variety of factors. For example, the employee matching circuit 128 may be configured to automatically match or pair employees to various tasks based on their respective employee rankings, candor levels, availability, interest levels, experience level, training level, proximity to the requested employee activity (e.g., physical location proximity), and/or a variety of other factors deemed relevant for a given employee activity. The employee matching circuit 128 may further allow for a user (e.g., a branch manager via the branch computing system 104) to select or provide an indication of who they would like to perform the given task. In some instances, the employee matching circuit 128 may then either proceed with the input selection/indicated employees or, if the employee matching circuit 128 determines that the selection is inappropriate, override the input selection/indicated employees.

The employee matching circuit 128 may further be configured to intentionally randomize identified or selected employees and/or employee pairings or to avoid pairings known to interact often, as noted above. For example, it may be desirable to have randomized employees and/or pairings of employees performing various activities to provide additional security. That is, if the same employee or pair of employees are consistently performing the same activity together, the potential for collusion and/or accidental negligence while performing the tasks (e.g., from boredom or disinterest due to repetitive performance of the same activity) may increase. Similarly, it may be desirable to avoid pairings known to interact often to provide additional security. For example, if a pair of employees is known to interact often, the potential for collusion and/or accidental negligence while performing the tasks may increase. By intentionally randomizing the identified employees and/or employee pairings and/or by intentionally avoiding pairings known to interact often, different employees and/or sets of employees may be selected each time an employee activity is required, which may thus decrease the potential for collusion and/or accidental negligence while performing the tasks.

In some instances, the employee matching circuit 128 may further be configured to randomize the employee identification and/or selection by employee location. For example, if an employee activity is required at branch A in location A (e.g., a branch location in Chicago, Ill.) that requires dual custody, the employee matching circuit 128 may select employee A from branch A and an employee B from branch B in location B (e.g., a branch location in San Francisco, Calif.). Employee B may then perform the action with, monitor, and/or oversee employee A while employee A performs the various tasks associated with the dual custody activity. Accordingly, because employee A and employee B are randomly selected and are also from differing locations, the likelihood that employee A and employee B know each other (e.g., have a personal relationship) is reduced, thereby reducing the likelihood of collusion between employee A and employee B.

The employee ranking circuit 130 is structured to receive a variety of information pertaining to each employee associated with the provider, and to determine and/or update an employee ranking associated with each employee. For example, the employee ranking may be a trustworthiness and competency score. In some instances, the employee ranking may be given as a number score (e.g., an employee ranking of 1-100), a percentage of trustworthiness (e.g., an employee ranking of 1-100%), a description of the employee ranking (e.g., "very high," "moderate," "very low"), a color-coded ranking (e.g., green, yellow, and red for very high, moderate, and very low rankings, respectively), and/or any other suitable method for providing the employee ranking.

The employee ranking may be based on any of the employee experience level, one or more reliability surveys, the employee's history (e.g., whether the employee has a history of being short on cash, whether the employee has a history of not paying attention during secure activities, past human resource incidents, job performance history), the employee's efficiency score, the employee's training level (e.g., whether the employee has completed various provider-provided trainings), the employee's customer-provided rating (e.g., determined via customer feedback or surveys), and/or any other pertinent information pertaining to the employee.

For example, in some instances, if an employee has a positive history of completing dual custody activity tasks successfully (e.g., no incorrect/suspicious behavior occurs while performing dual custody activity tasks, nothing goes missing while dual custody activity tasks are performed), the employee may be given a very high employee ranking (e.g., 100, "very high," green). Conversely, if an employee has a negative history of completing dual custody activity tasks successfully (e.g., incorrect/suspicious behavior occurs while performing dual custody activity tasks, valuables or other items go missing while dual custody activity tasks), the employee may be given a very high employee ranking (e.g., 0, "very low," red).

The employee ranking circuit 130 may be configured to increase an employee's employee ranking for a variety of reasons. In some instances, if an employee wishes to increase their employee ranking, they may perform any of a variety of ranking improvement actions. For example, the ranking improvement actions may include the employee proving they are paying attention during a dual custody activity (e.g., via various feedback indications throughout performance of the dual custody activity), volunteering to be an observer for a dual custody activity, being assigned a trainer (e.g., that oversees the employee while performing various activities and provides instruction and feedback), providing a consistently high level of customer service (e.g., as indicated in various customer feedback and surveys), performing tasks accurately and efficiently, and/or any other suitable action deemed suitable for improving the employee ranking.

The employee ranking circuit 130 may similarly be configured to decrease an employee's employee ranking for a variety of reasons. In some instances, an employee may decrease their employee ranking by performing any of a variety of ranking decreasing actions. For example, the ranking decreasing actions may include the employee committing suspicious behavior while performing a dual custody activity, the employee being negligent or not paying attention while performing a dual custody activity, the employee discussing non-relevant matters while performing a dual custody activity, the employee performing tasks inefficiently or inaccurately, the employee providing a consistently low level of customer service (e.g., as indicated in various customer feedback and surveys), valuables or other items going missing while the employee performs the dual custody activity, and/or any other suitable action deemed suitable for decreasing the employee ranking.

In some instances, the employee ranking circuit 130 may further receive feedback from the employee's supervisor(s) (e.g., branch supervisor, branch manager, district manager) that may affect whether the employee ranking is increased or decreased. For example, if the employee ranking circuit 130 receives feedback indicating that the employee has been performing well, their employee ranking may be increased. Conversely, if the employee ranking circuit 130 receives feedback indicating that the employee has been performing poorly, their employee ranking may be decreased. Accordingly, in some instances, the branch manager (or the district manager or any other supervisory-level employee) may rate the employee's performance after a dual custody activity is completed, and this rating may be taken into account when updating the employee's employee ranking.

In some instances, the employee ranking circuit 130 is configured to increase or decrease an employee's employee ranking automatically, without instruction from a user. That is, in some instances the employee ranking circuit 130 may be configured to employ various artificial intelligence (AI) models to study various inputs received and/or historical data pertaining to employee rankings and how they are generally affected by different employee actions. That is, the AI models can be trained to automatically rank and continuously update the employee ranking for each employee based on the various employee information, ranking improvement actions, and/or ranking decreasing actions discussed herein by studying user inputs (e.g., from branch managers, district managers, and/or other supervisory-level employees) and/or historical data related to employee rankings.

Additionally, the employee ranking circuit 130 may further be configured to receive feedback from various provider employees, district managers, and/or branch managers (e.g., received from the users' corresponding systems and/or devices) to gradually modify, update, and/or further train the AI models. For example, the employee ranking circuit 130 may employ any suitable machine learning method, such as regression, gradient boosting, neural networks, and/or any other tools deemed suitable for a given application.

The interactive monitoring circuit 132 is structured to automatically monitor or allow a user to monitor the identified employee(s) before, during, or after performing the requested or required employee activity and provide instructions and/or feedback to the employee(s). For example, the interactive monitoring circuit 132 may communicate with the branch computing system 104 to transmit and receive various information pertaining to the employee(s) performing the requested employee activity. In some instances, as will be described below, the branch computing system 104 may be communicably coupled to various audio/video (A/V) outputs 152 and various sensors 154. Accordingly, the interactive monitoring circuit 132 may be configured to provide instructions and feedback to the employee(s) before, during, and/or after performing the requested employee activity via the A/V outputs 152. Further, the interactive monitoring circuit 132 may be configured to receive various monitoring information (e.g., audio streams, video streams) to actively monitor the employee(s) before, during, and/or after performing the requested employee activity via the sensors 154.

In some instances, the interactive monitoring circuit 132 may allow for a provider employee, a district manager, a branch manager, and/or any other appropriate entity to actively view and monitor (e.g., via the branch computing system 104) live-feeds from the sensors 154 and provide live instructions and/or feedback using the A/V outputs 152. In some instances, the data collected from the various sensors 154 (e.g., audio data, video data) may further be recorded and stored for later viewing (e.g., in a database of the memory 120 of the provider computing system 102), thereby allowing for improved dispute resolution in the case that currency or other valuables go missing during a particular employee activity. In some instances, the interactive monitoring circuit 132 may additionally or alternatively incorporate various artificial intelligence (AI) models to study various historical audio and/or visual data and corresponding activity requirements to be able to automatically identify suspicious and/or incorrect behavior. In some instances the AI models of the interactive monitoring circuit 132 may further be trained using suspicious behavior training data obtained from external databases accessible via an API, as noted above. The interactive monitoring circuit 132 may further employ any suitable machine learning method, such as regression, gradient boosting, neural networks, and/or any other tools deemed suitable for a given application.

In some instances, the interactive monitoring circuit 132 may further be configured to continuously learn from the live instructions and/or feedback provided by any of the appropriate entities above to gradually modify, update, and/or further train the AI models. For example, in some instances, the AI models may allow the interactive monitoring circuit 132 to initially flag an event as suspicious and/or incorrect and automatically notify a provider employee, a district manager, a branch manager, or any other appropriate entity for verification. As such, the appropriate entity may view a live-feed and/or recording of the employees performing the employee activity and provide feedback (e.g., verification that the event was suspicious/incorrect or an indication that the event was not suspicious/incorrect). The AI models may then update their training to reinforce or modify their future identifications of suspicious and/or incorrect behavior based on the appropriate entity's feedback.

In any case, the interactive monitoring circuit 132 may allow for the identification of suspicious and/or incorrect behavior. For example, the various sensors 154 may be used to track the employees while they are performing a requested activity, such as a dual custody activity. If the interactive monitoring circuit 132 flags the employees' actions as either suspicious and/or incorrect, the interactive monitoring circuit 132 may be configured to provide real-time feedback to the employees, provide an alert or notification to an appropriate supervisory entity (e.g., a branch manager, a district manager) to verify the employees' behavior, and/or update the employees' employee ranking, if appropriate.

It should be understood that "suspicious activity," "incorrect activity," and "inappropriate activity" may be used interchangeably and are used to encompass a variety of activity types including nefarious behavior (e.g., theft), incorrect behavior (e.g., performing various tasks out of order or insufficiently), inappropriate behavior (e.g., talking about non-essential topics while performing secure activities), or any other types of activities that may be undesirable during a secure activity. For example, suspicious, incorrect, and/or inappropriate activities may include the employees not performing a task correctly, taking too much time performing a particular task, talking about topics not pertaining to the employee activity, standing with a suspicious posture (e.g., potentially hiding something from the camera or sensor 154), continuously having their backs turned to the camera or sensor 154, wearing inappropriate or unapproved clothing, blocking a particularly important element (e.g., a vault, a safety deposit box) from a view of the camera or sensor 154, looking at their mobile device, generally not paying attention, deviating from job standards related to the employee activity, committing theft, and/or various other suspicious behavioral indicators.

Further, in some instances, the suspicious, incorrect, and/or inappropriate activities may be identified based on situational information. For example, the interactive monitoring circuit 132 may be configured to flag behavior as suspicious if a sensor 154 indicates that one or more of the employees has a sudden increase in heart rate. In another example, the interactive monitoring circuit 132 may be configured to identify that too many people or not enough people are in a given area (e.g., within a vault) for a given employee activity and flag that as suspicious behavior. In yet another example, if the temperature of an object or area in the room the employee is in suddenly changes while the employee is performing the employee activity, this may also be flagged by the interactive monitoring circuit 132.

The authorization circuit 134 is structured to automatically provide or allow various supervisory-level employees (e.g., branch managers, district managers) to provide authorization to various employees to perform employee activities that require authorization (e.g., dual custody activities requiring authentication and authorization). In some instances, the authorization circuit 134 may be configured to automatically provide authorization credentials to various employees selected to perform requested employee activities. For example, in some instances, the authorization credentials may be transmitted by the authorization circuit 134 to a device associated with the selected employee(s) (e.g., the first employee device 106 and/or the second employee device 108) to allow the employee(s) to interact with and/or access required materials and/or information necessary for completion of the requested employee activity. The authorization credentials may include a one-time passcode or password, a digital key or token configured to be wirelessly transmitted from the employee's device to various devices associated with the requested employee activity, or any other suitable credential for authorizing the identified employees.

In some instances, the authorization circuit 134 may be configured to allow various supervisory-level employees (e.g., branch managers, district managers) to select various lower-level employees (e.g., bankers, tellers) to be authorized to perform the employee activities that require authorization. Once the supervisory-level employee has selected to authorize the various lower-level employees, the authorization circuit 134 may be configured to automatically provide the corresponding authorization credentials to the corresponding employee devices (e.g., the first employee device 106 and/or the second employee device 108). The various employee devices (e.g., the first employee device 106 and/or the second employee device 108) may then receive notifications indicating that they have been selected and/or authorized to perform various tasks associated with the requested employee activity.

In some instances, the authorization circuit 134 may further be configured to de-authorize or temporarily suspend various employee devices (e.g., the first employee device 106 and/or the second employee device 108) based on an indication that suspicious activity has taken place. For example, the authorization circuit 134 is in communication with the interactive monitoring circuit 132, and may thus receive indications of suspicious behavior or situations from the interactive monitoring circuit 132 while the employee or employees are performing the requested employee activity. In some instances, upon receipt of an indication that suspicious activity has taken place, the authorization circuit 134 may automatically de-authorize the various employee devices. In some other instances, upon receipt of the indication that suspicious activity has taken place, the authorization circuit 134 may instead temporarily suspend the authorization of the various employee devices until the suspicious activity is confirmed or denied by a supervisory-level employee (e.g., a branch manager or a district manager). In these instances, if the supervisory-level employee confirms the suspicious activity, the authorization circuit 134 may fully de-authorize the employee devices. Otherwise, if the supervisory-level employee denies the suspicious activity (e.g., certifies or otherwise states that no suspicious activity has occurred), then the authorization circuit 134 may reinstate or reactivate the authorization of the various employee devices.

The input/output circuit 118 is structured to receive communications from and provide communications to provider employees associated with the provider computing system 102. In this regard, the input/output circuit 118 is structured to exchange data, communications, instructions, etc. with an input/output component of the provider computing system 102. In one embodiment, the input/output circuit 118 includes an input/output device. In another embodiment, the input/output circuit 118 includes communication circuitry for facilitating the exchange of data, values, messages, and the like between an input/output device and the components of the provider computing system 102. In yet another embodiment, the input/output circuit 118 includes machine-readable media for facilitating the exchange of information between an input/output device and the components of the provider computing system 102. In still another embodiment, the input/output circuit 118 includes any combination of hardware components, communication circuitry, and machine-readable media.

For example, in some embodiments, the input/output circuit 118 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 118 provides an interface for the user to interact with various applications (e.g., the provider client application 124) stored on the provider computing system 102.

The branch computing system 104 similarly includes a network interface circuit 140, a processing circuit 142, and an input/output circuit 144. The network interface circuit 140, the processing circuit 142, and the input/output circuit 144 may function substantially similar to and include the same or similar components as the network interface circuit 114, the processing circuit 116, and the input/output circuit 118 described above, with reference to the provider computing system 102. Accordingly, it will be understood that the description of the network interface circuit 114, the processing circuit 116, and the input/output circuit 118 of the provider computing system 102 provided above may be similarly applied to the network interface circuit 140, the processing circuit 142, and the input/output circuit 144 of the branch computing system 104.

For example, the network interface circuit 140 is similarly structured and used to establish connections with other computing systems (e.g., the provider computing system 102, the first employee device 106, the second employee device 108, the customer device 110) by way of the network 112. The network interface circuit 140 may further include any or all of the components discussed above, with reference to the network interface circuit 114.

The processing circuit 142 similarly includes a memory 146 and a processor 148. The memory 146 and the processor 148 are substantially similar to the memory 120 and the processor 122 described above. As such, the branch computing system 104 is similarly configured to run a variety of application programs and store associated data in a database of the memory 146. One such application may be a branch client application 150.

The branch client application 150 may be substantially similar to the provider client application 124, but may instead be tailored toward branch employees or a branch manager. For example, branch client application 150 is similarly structured to provide displays to the branch computing system 104 to allow for branch managers or district managers to oversee and/or otherwise interact with or intervene in various activities performed by employees to provide improved security.

Specifically, the branch client application 150 is similarly configured to communicate with the provider computing system 102, the first employee device 106, the second employee device 108, and the customer device 110 to receive employee activity requests, receive task instructions associated with the requested employee activity, identify appropriate employees for performing the various tasks associated with the requested employee activity, provide authorization to the identified employees, receive monitoring information and provide real-time feedback to and/or from the identified employees before, during, and/or after performing the tasks associated with the requested employee activity, and provide feedback for the provider computing system 102 to use to update various employee rankings. Accordingly, the branch client application 150 is communicably coupled to the provider computing system 102, the first employee device 106, the second employee device 108, and the customer device 110.

The branch client application 150 may thus communicate with the provider computing system 102, the first employee device 106, the second employee device 108, and the customer device 110 to perform a variety of functions. For example, as will be described herein, the branch client application 150 is configured to allow for a branch manager or a district manager to select appropriate employees for various employee activities. In some instances, the branch client application 150 is further configured to allow for the branch manager or the district manager to select appropriate matches or pairs of appropriate employees for dual custody activities. The branch client application 150 may further be configured to allow the branch manager or district manager to interactively monitor the selected employee(s) while they perform the requested employee activity, similar to the provider client application 124 discussed above. The branch client application 150 may similarly be configured to provide authorization to the selected employees. For example, in some instances, the branch client application 150 may be configured to provide the branch manager or the district manager with an interactive interface (e.g., interactive interface 500 shown in FIG. 5) for performing the various tasks mentioned above.

In some instances, the branch client application 150 may require authentication of the user (e.g., from the branch manager or the district manager) prior to authorizing the selected employees. For example, the branch client application 150 may require the user to enter a password, a personal identification number (PIN), to scan their fingerprint, to be verified via facial recognition, to be verified via voice recognition, and/or to be authenticated any other suitable authentication methods.

It should be understood that, although the provider computing system 102 is shown as including the procedural determination circuit 126, the employee matching circuit 128, the employee ranking circuit 130, the interactive monitoring circuit 132, and the authorization circuit 134, in some instances, the branch computing system 104 may additionally or alternatively include similar or identical circuits configured to perform the various tasks and procedures discussed above, with reference to the provider computing system 102. For example, in some instances, the processing circuit 142 may similarly include any or all of a procedural determination circuit (e.g., similar to the procedural determination circuit 126), an employee matching circuit (e.g., similar to the employee matching circuit 128), an employee ranking circuit (e.g., similar to the employee ranking circuit 130), an interactive monitoring circuit (e.g., similar to the interactive monitoring circuit 132), and an authorization circuit (e.g., similar to the authorization circuit 134). Accordingly, it will be understood that any of the aforementioned capabilities of the provider computing system 102 may similarly be incorporated into the branch computing system 104, as desired for a given application.

The input/output circuit 144 may function substantially similarly to and include the same or similar components as the input/output circuit 118 described above, with reference to the provider computing system 102. Accordingly, it will be understood that the description of the input/output circuit 118 provided above may also be applied to the input/output circuit 144 of the branch computing system 104. For example, the input/output circuit 144 is similarly structured to receive communications from and provide communications to the branch employees and/or the branch manager associated with the branch computing system 104.

The branch computing system 104 may further be communicably coupled to one or more audio/video (A/V) outputs 152 and one or more sensors 154. The A/V outputs 152 and the one or more sensors 154 may be utilized by the interactive monitoring circuit 132 (or an interactive monitoring circuit of the branch computing system 104) to provide instructions to various employees performing tasks associated with various employee activities. For example, the A/V outputs 152 may comprise audio speakers, video displays, video monitors, mobile phones, personal computers (e.g., desktop computers or laptop computers), tablets, smart watches or other wearable devices, headphones, virtual/augmented (VR/AR) systems (e.g., smart glasses, VR headset), appliances, internet of things (IoT) devices, voice assistants, and/or any other suitable user computing devices. The one or more sensors 154 may comprise audio recording devices, video recording devices, accelerometers, weight sensors, thermal sensors, night-vision sensors, cameras, physiological sensors (e.g., heart beat sensors, body temperature sensors), or any other suitable sensors 154 suitable for actively monitoring an employee while the employee completes a given task associated with an employee activity. In some instances, the A/V outputs 152 and the sensors 154 may be integrated into a single interactive two-way communication device configured to display and receive various audio and video information and/or streams while the employee(s) is/are performing the given task.

The first employee device 106 and the second employee device 108 may be substantially similar. For example, the second employee device 108 may include substantially similar components to the first employee device 106, and those components may function substantially similar to the components of the first employee device 106. Accordingly, it will be understood that the following description of the first employee device 106 may also be applied to the second employee device 108.

The first employee device 106 (as well as the second employee device 108) may be any of a variety of suitable user computing devices. For example, the first employee device 106 (as well as the second employee device 108) may comprise a mobile phone, a personal computer (e.g., a desktop computer or a laptop computer), a tablet, a smart watch or other wearable device, headphones (e.g., having a microphone for interactive communication capabilities), a virtual/augmented reality (VR/AR) system (e.g., smart glasses), and/or any other suitable user computing device capable of accessing and communicating using local and/or global networks (e.g., the network 112).

As such, the first employee device 106 (as well as the second employee device 108) similarly includes a network interface circuit 156, a processing circuit 158, and an input/output circuit 160. The network interface circuit 156, the processing circuit 158, and the input/output circuit 160 may function substantially similar to and include the same or similar components as the network interface circuit 114, the processing circuit 116, and the input/output circuit 118 described above, with reference to the provider computing system 102. Accordingly, it will be understood that the description of the network interface circuit 114, the processing circuit 116, and the input/output circuit 118 of the provider computing system 102 provided above may be similarly applied to the network interface circuit 156, the processing circuit 158, and the input/output circuit 160 of the first employee device 106 (as well as the second employee device 108).

For example, the network interface circuit 156 is similarly structured and used to establish connections with other computing systems (e.g., the provider computing system 102, the branch computing system 104, the other of the first employee device 106 or the second employee device 108, the customer device 110) by way of the network 112. The network interface circuit 156 may further include any or all of the components discussed above, with reference to the network interface circuit 114.

The processing circuit 158 similarly includes a memory 162 and a processor 164. The memory 162 and the processor 164 are substantially similar to the memory 120 and the processor 122 described above. As such, the first employee device 106 (as well as the second employee device 108) is similarly configured to run a variety of application programs and store associated data in a database of the memory 162. One such application may be an employee client application 166.

The employee client application 166 may be substantially similar to the provider client application 124 and the branch client application 150, but may instead be tailored toward branch employees. For example, employee client application 166 is structured to provide displays to the first employee device 106 and/or the second employee device 108 to receive various instructions and feedback and to interactively provide progress indications while performing various requested employee activities. Specifically, the employee client application 166 is configured to communicate with the provider computing system 102, branch computing system 104, the other of the first employee device 106 or the second employee device 108 (depending on which device is accessing the employee client application 166), and the customer device 110 to receive task instructions pertaining to given requested employee activities, receive authorization credentials associated with performing the various tasks associated with the requested employee activities, and provide monitoring information and receive real-time feedback to and/or from supervisory-level employees (e.g., provider employees, branch managers, district managers) before, during, and/or after performing the tasks associated with the requested employee activity. Accordingly, the employee client application 166 is communicably coupled to the provider computing system 102, the branch computing system 104, the other of the first employee device 106 or the second employee device 108, and the customer device 110.

The employee client application 166 may thus communicate with the provider computing system 102, the branch computing system 104, the other of the first employee device 106 or the second employee device 108, and the customer device 110 to perform a variety of functions. For example, the employee client application 166 is configured to provide real-time instructions to the user. As will be described herein, in some instances, the employee device (e.g., the first employee device 106 and/or the second employee device 108) may be configured to communicate live audio and video information to and/or from the provider computing system 102 and/or the branch computing system 104. In some instances, the employee client application 166 may be configured to provide the employee with an interactive interface (e.g., interactive interface 600 shown in FIG. 6) that may provide an augmented reality overlay that provides step-by-step instructions on how to perform the requested employee activity. The interactive interface may further allow the employee to mark various tasks complete as they progress through performing the requested employee activity, as will be further discussed below.

Further, in some instances, the employee client application 166 may require authentication of the user prior to its usage. For example, the employee client application 166 may require the user to enter a password, a personal identification number (PIN), to scan their fingerprint, to be verified via facial recognition, to be verified via voice recognition, and/or to be authenticated by any other suitable authentication methods.

The input/output circuit 160 may function substantially similarly to and include the same or similar components as the input/output circuit 118 described above, with reference to the provider computing system 102. Accordingly, it will be understood that the description of the input/output circuit 118 provided above may also be applied to the input/output circuit 160 of the first employee device 106 and/or the second employee device 108. For example, the input/output circuit 160 is similarly structured to receive communications from and provide communications to the employees associated with the first employee device 106 and/or the second employee device 108.

The customer device 110 may similarly be any of a variety of suitable user computing devices. For example, the customer device 110 may comprise a mobile phone, a personal computer (e.g., a desktop computer or a laptop computer), a tablet, a smart watch or other wearable device, headphones (e.g., having a microphone for interactive communication capabilities), a virtual/augmented reality (VR/AR) system (e.g., smart glasses), and/or any other suitable user computing device capable of accessing and communicating using local and/or global networks (e.g., the network 112).

As such, the customer device 110 similarly includes a network interface circuit 168, a processing circuit 170, and an input/output circuit 172. The network interface circuit 168, the processing circuit 170, and the input/output circuit 172 may function substantially similar to and include the same or similar components as the network interface circuit 114, the processing circuit 116, and the input/output circuit 118 described above, with reference to the provider computing system 102. Accordingly, it will be understood that the description of the network interface circuit 114, the processing circuit 116, and the input/output circuit 118 of the provider computing system 102 provided above may be similarly applied to the network interface circuit 168, the processing circuit 170, and the input/output circuit 172 of the customer device 110.

For example, the network interface circuit 168 is similarly structured and used to establish connections with other computing systems (e.g., the provider computing system 102, the branch computing system 104, the first employee device 106, the second employee device 108) by way of the network 112. The network interface circuit 168 may further include any or all of the components discussed above, with reference to the network interface circuit 114.

The processing circuit 170 similarly includes a memory 174 and a processor 176. The memory 174 and the processor 176 are substantially similar to the memory 120 and the processor 122 described above. As such, the customer device 110 is similarly configured to run a variety of application programs and store associated data in a database of the memory 174. One such application may be an customer client application 178.

The customer client application 178 may be substantially similar to the provider client application 124, the branch client application 150, and the employee client application 166, but may instead be tailored toward the customer. For example, customer client application 178 is structured to provide displays to the customer device 110 to allow for the customer to request a variety of requestable actions. Each requestable action may have a variety of required employee activities associated therewith (e.g., which may be stored in the procedural database 136 of the provider computing system 102). Once the customer has requested a requestable action, it may be transmitted to the provider computing system 102 and/or the branch computing system 104, and the requested action (and thus the associated employee activities) may be performed in accordance with the systems and methods described herein. Accordingly, the customer client application 178 is communicably coupled to the provider computing system 102, the branch computing system 104, the first employee device 106 and the second employee device 108.

Further, in some instances, the customer client application 178 may require authentication of the user prior to its usage. For example, the customer client application 178 may require the user to enter a password, a personal identification number (PIN), to scan their fingerprint, to be verified via facial recognition, to be verified via voice recognition, and/or to be authenticated any other suitable authentication methods.

The input/output circuit 172 may function substantially similarly to and include the same or similar components as the input/output circuit 118 described above, with reference to the provider computing system 102. Accordingly, it will be understood that the description of the input/output circuit 118 provided above may also be applied to the input/output circuit 172 of the customer device 110. For example, the input/output circuit 172 is similarly structured to receive communications from and provide communications to the customer associated with the customer device 110.

Figure 3:
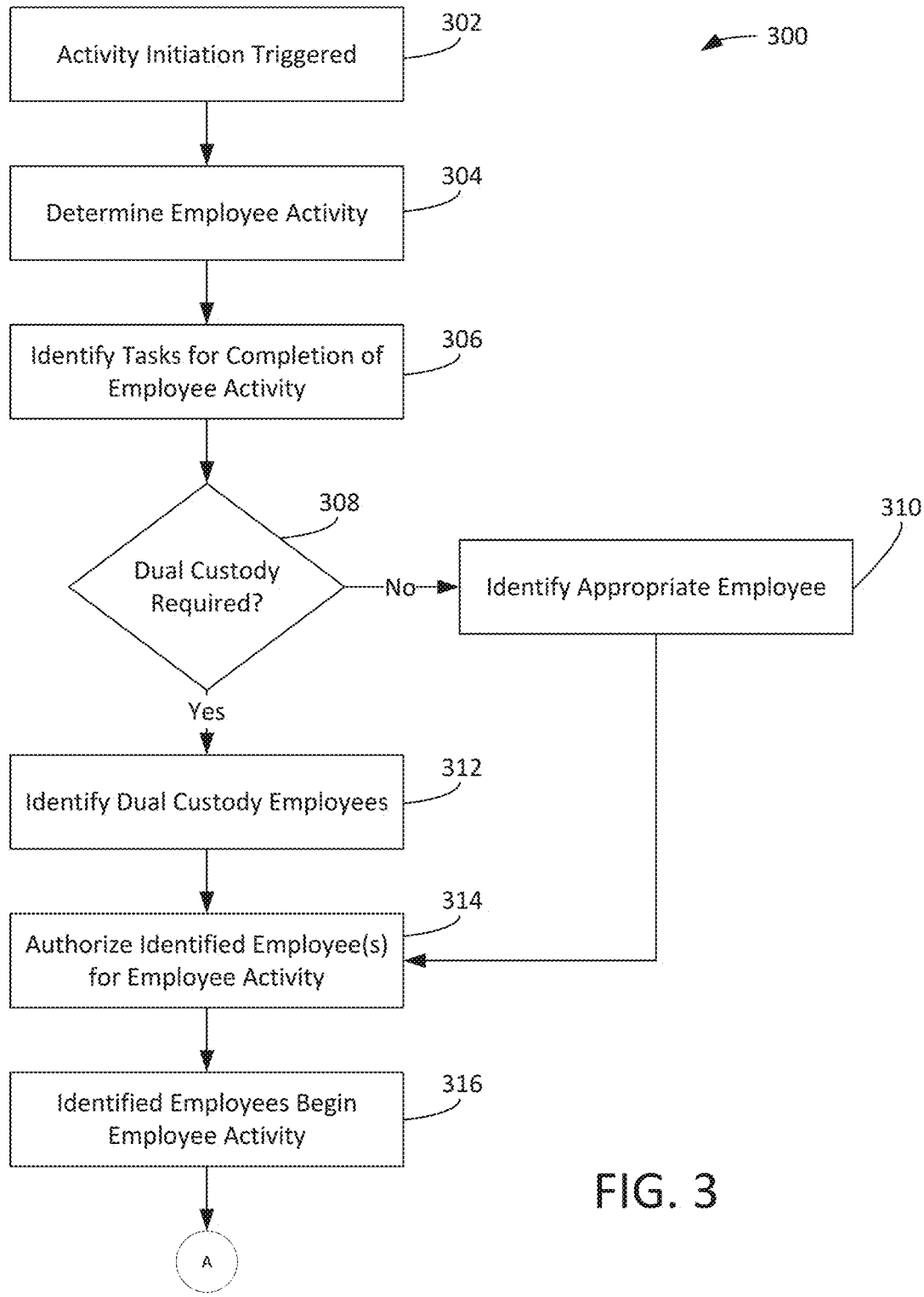
FIG. 3 is a first portion of a flow diagram of a method for securely completing an employee activity, according to an example embodiment.
Figure 4:
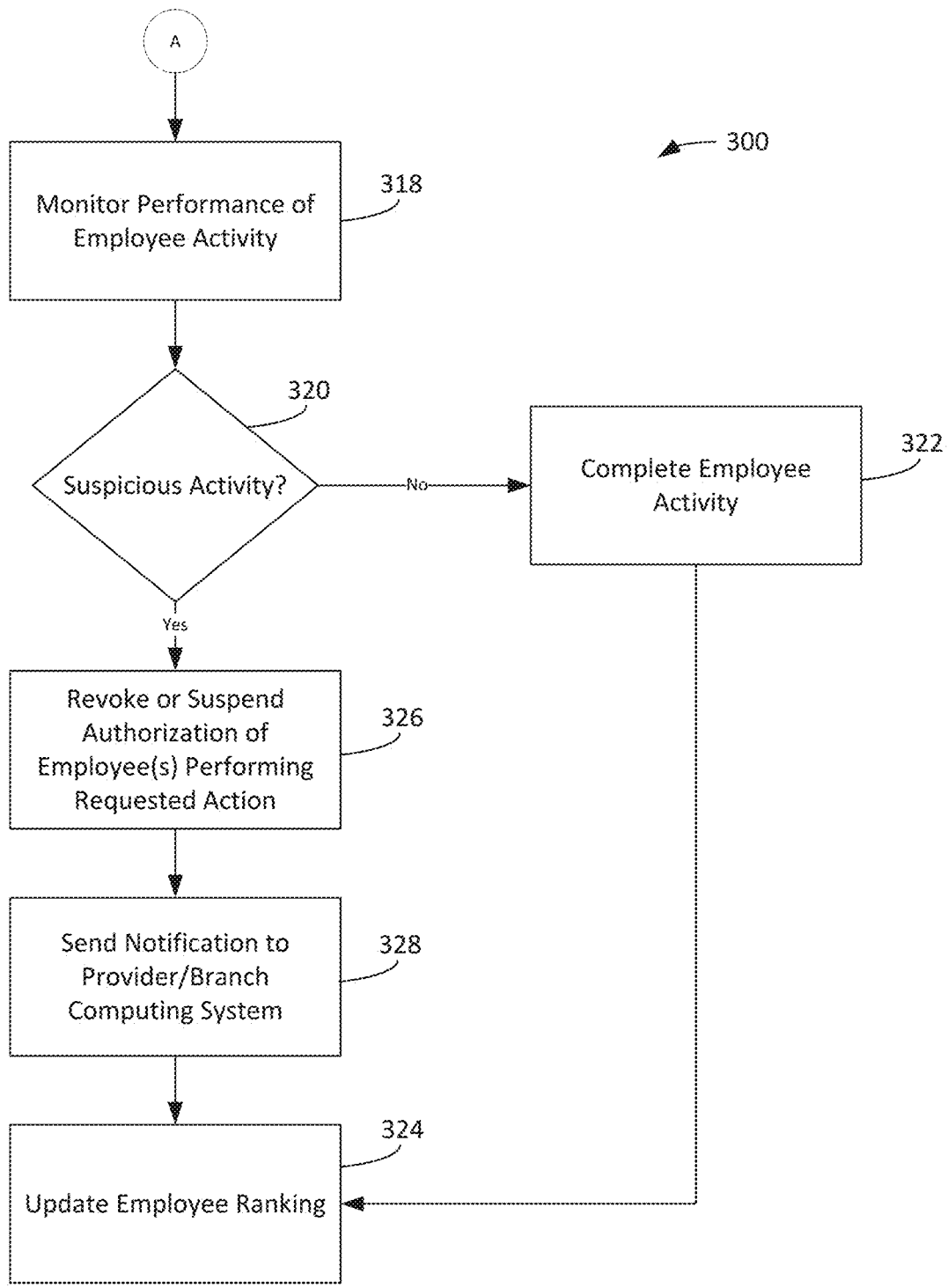
FIG. 4 is a second portion of the flow diagram of FIG. 3 of the method for securely completing an employee activity, according to an example embodiment.

Referring to FIGS. 3 and 4, a flow diagram of a method 300 for securely completing an employee activity (e.g., a dual custody activity or a non-dual custody activity) is shown according to an example embodiment. The method 300 may be performed by the secure activity management system 100 described above. The method 300 begins when an activity initiation is triggered, at step 302. The activity initiation may be triggered by a variety of actions. In some instances, the activity initiation may be triggered by a requested action from a customer (e.g., a large cash withdrawal or deposit, a safety deposit box withdrawal or deposit). For example, the customer may select various requestable actions using the customer client application 178. Alternatively, the activity initiation may be triggered by various scheduled activities. For example, scheduled activities may include, among other things, various cash flow services (e.g., armored car cash deliveries/pickups).

Once the activity initiation has been triggered, at step 302, an employee activity associated with the activity initiation may then be determined, at step 304. In some instances, the procedural determination circuit 126 may be configured to determine the employee activity based on the activity initiation. For example, the activity initiation may automatically produce or provide an activity indicator (e.g., within any of the corresponding systems and/or devices described herein) indicating which employee activity is associated with the activity initiation. The activity indicator may thus be provided or transmitted to the provider computing system 102 and used by the procedural determination circuit 126 to determine the associated employee activity.

After determining the employee activity associated with the activity initiation, at step 304, the necessary tasks for completion of the employee activity may be identified, at step 306. For example, after the procedural determination circuit 126 has determined the associated employee activity, the procedural determination circuit 126 may then match the determined employee activity to a corresponding potential employee activity stored within the procedural database 136. Accordingly, by matching the determined employee activity to the stored potential employee activity, the procedural determination circuit 126 may then retrieve the corresponding procedural information for the determined employee activity. As alluded to above, the procedural information may include a list of tasks associated with the employee activity, a corresponding list of task requirements (e.g., whether the task is a dual custody task or activity) and/or job standards (e.g., an allotted completion time) associated with each of the identified tasks, and a set of instructions for performing each of the identified tasks.

Once the list of tasks associated with the employee activity have been identified, at step 306, it may then be determined whether dual custody is required for the employee activity (e.g., whether the employee activity is a dual custody activity), at step 308. If dual custody is not required, an appropriate employee for performing the employee activity is identified, at step 310. In some instances, the employee matching circuit 128 may be configured to automatically match an appropriate employee to the employee activity based on the list of task requirements and/or job standards associated with the employee activity and a variety of information pertaining to the employee (e.g., information stored within the employee database 138). That is, based on the list of task requirements and/or job standards associated with the employee activity, various employees may not be able to perform the employee activity. For example, the task requirements may require that the task be performed by an employee having a certain experience level, efficiency score, availability, cash handling approval limit, training credentials, and/or a variety of other task requirements. Accordingly, the employee matching circuit 128 may be configured to select appropriate employees having appropriate criteria for the employee activity based on the task requirements associated with the employee activity.

Further, the employee matching circuit 128 may further select the appropriate employee to perform the employee activity based on the employee ranking. For example, if multiple employees have similar or satisfactory credentials based on the task requirements for a given employee activity, the employee matching circuit 128 may select from all of the appropriate employees by selecting the employee with the highest employee ranking.

In some instances, the employee matching circuit 128 may further allow for a user (e.g., a branch manager or a district manager) to select or provide an indication of which employee they would like to perform the employee activity. In some instances, the employee matching circuit 128 may simply use the user's selection to identify the appropriate employee. In some other instances, the employee matching circuit 128 may be configured to first ensure that the user's selection is appropriate based on the task requirements associated with the employee activity before using the user's selection to identify the appropriate employee.

If dual custody is required, an appropriate set (e.g., pair) of employees is identified, at step 312. In some instances, the employee matching circuit 128 may be configured to identify the appropriate set of employees to the employee activity in an identical manner to that described above, with respect to step 310. That is, the employee matching circuit 128 may similarly select a necessary amount (typically, but not always a pair) of employees having appropriate criteria for the employee activity based on the various task requirements associated with the employee activity. Further, the employee matching circuit 128 may similarly select the appropriate employees to perform the employee activity based on the employee ranking.

Furthermore, as alluded to above, if dual custody is required, the employee matching circuit 128 may further be configured to intentionally randomize employee pairings (or other sized groupings). Dual custody activities are generally high-risk activities requiring a higher level of security. For example, dual custody activities may be activities handling large amounts of currency and/or various other valuables, which may be particularly risky activities from the provider's perspective (e.g., potential for theft and/or loss of currency and/or other valuables). Accordingly, the employee matching circuit 128 may intentionally randomize the employee pairings to allow for different sets of employees to be selected each time a given employee activity is required. This may effectively decrease the potential for collusion and/or accidental negligence (e.g., from boredom or disinterest due to repetitive performance of the same activity)

while the employees are performing the various tasks associated with the dual custody activity.

In some instances, the intentional randomization may be, in part, based on a randomized employee location. Accordingly, a first employee at a location where the employee activity is to be performed may be selected by the employee matching circuit 128, and a second employee taking part in the dual custody activity may be randomly selected from another location to remotely perform, monitor, and/or oversee the employee action with or performed by the first employee. By randomly selecting the second employee from a different location, the likelihood that the first and second employees know each other is reduced, thereby further reducing the likelihood of collusion between the two employees.

Additionally, in some instances, the employee matching circuit 128 may further be configured to intentionally avoid specific pairings of employees based on employee interaction information. Employee interaction information may include, for example, aligned employee work schedules, communication histories between employees, employee interaction comments provided by supervising employees, and/or any other information that is indicative of potential interactions between employees. For example, if a pair of employees have aligned work schedules, this may be indicative that the pair of employees interacts with each other more frequently. Because the pair of employees interacts more frequently, there is a higher risk of collusion between the pair of employees due to the pair of employees having a more developed relationship. In this case, the employee matching circuit 128 may intentionally avoid pairing the pair of employees together to perform sensitive and/or high-risk tasks (e.g., dual custody activity tasks). Similarly, if a pair of employees is known to communicate with each other frequently, either verbally (e.g., detected via various audio devices within a provider location) or electronically (e.g., using various devices associated with the pair of employees), this similarly indicates a more developed relationship between the pair of employees and a higher risk of collusion between the pair of employees. As such, in this case, the employee matching circuit 128 may similarly intentionally avoid pairing the pair of employees together to perform sensitive and/or high-risk tasks (e.g., dual custody activity tasks).

In either case, the intentional randomization (e.g., locational or otherwise) and/or the intentional avoidance of specific pairings may be used in combination with the employee ranking when identifying employees. For example, in some instances, a given employee activity may have a "threshold ranking" and a variety of activity requirements (e.g., task requirements) that an employee has to meet or exceed to perform. Accordingly, the employee matching circuit 128 may identify a subset of available employees meeting the necessary criteria to perform the corresponding employee activity. The employee matching circuit 128 may then randomly select employees from the identified subset of available employees and/or intentionally avoid specific pairings within the identified subset of available employees.

Further, in some instances, the employee matching circuit 128 may similarly allow for a user (e.g., a branch manager or a district manager) to select or provide an indication of which employees they would like to perform the dual custody activity, as described above, with respect to step 310. Again, the employee matching circuit 128 may simply use the user's selections to identify the appropriate employees or may first ensure that the user's selections are appropriate based on the task requirements associated with the employee activity before using the user's selections to identify the appropriate employees. In some instances, the employee matching circuit 128 is configured to provide various appropriate employee options to a user (e.g., a supervising employee, a branch manager, a district manager) to allow for the user to select or provide an indication of which employees they would like to perform the dual custody activity.

Figure 5:
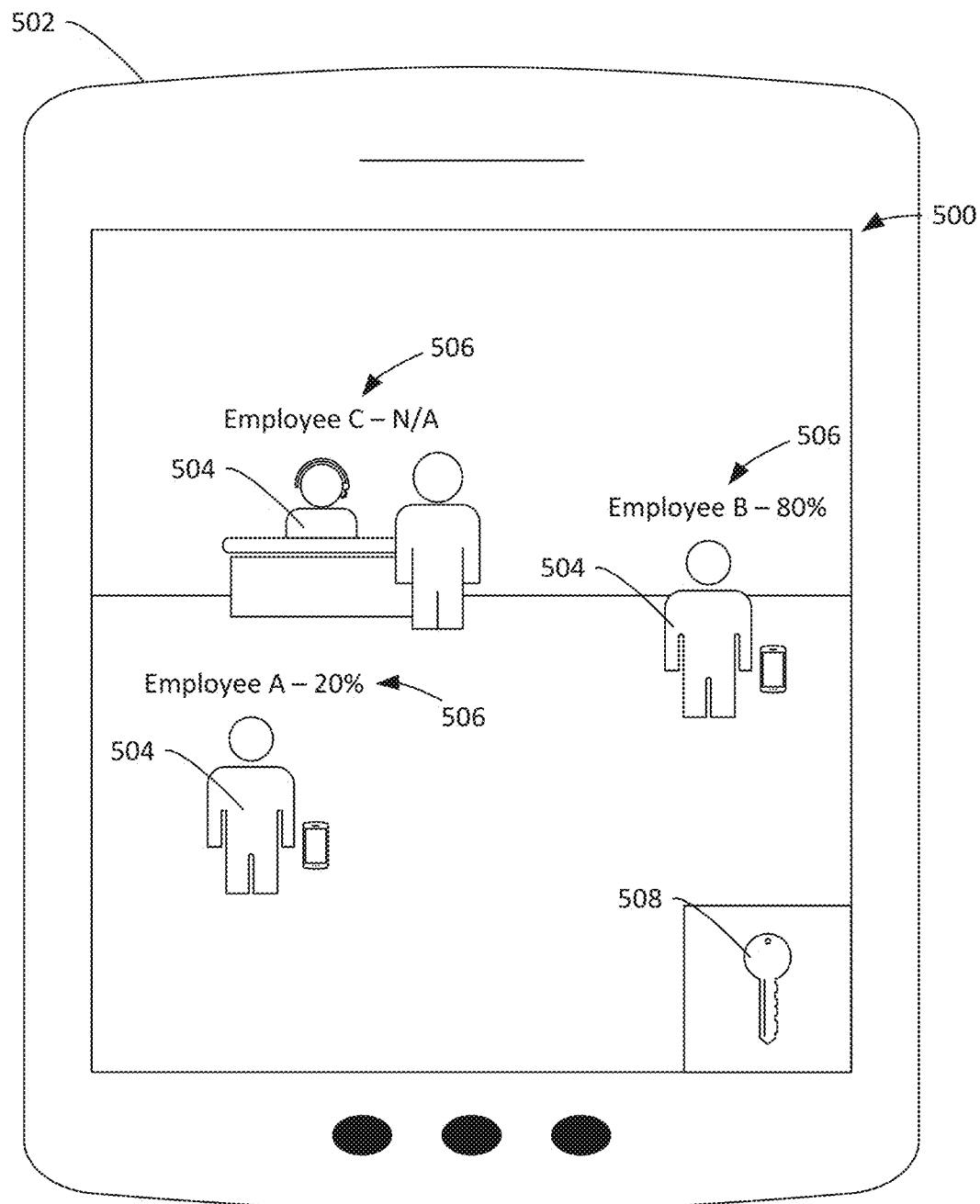
FIG. 5 is a user interface showing an interactive interface with an augmented reality overlay allowing for the selection of various employees to perform a given employee activity, according to an example embodiment.

For example, the employee matching circuit 128 may be configured to provide the various appropriate employee options indicating a plurality of employees capable of or eligible for performing an identified task or set of tasks to the user via a mobile device associated with the provider computing system 102 or the branch computing system 104 (e.g., the mobile device 502 shown in FIG. 5). For example, the user may select a first employee for the dual custody activity and then be presented with pairing rankings for other potential employee options. The pairing rankings may be similar to the employee rankings, but may serve as an indicator of the appropriateness of a given employee pairing. For example, the pairing ranking may be a number pairing score (e.g., a pairing ranking of 1-100), a descriptive pairing score (e.g., "very good," "moderate," "inappropriate"), a color-coded pairing ranking (e.g., green, yellow, and red for a very good pairing, a moderate pairing, and an inappropriate pairing, respectively), and/or any other suitable indicator for the appropriateness of an employee pairing. For example, in some instances, the employee matching circuit 128 is configured to provide the various appropriate employee options and/or the various pairing rankings to the user via an augmented reality overlay (e.g., the interactive interface 500 shown in FIG. 5).

Once the appropriate employee or dual custody employees (referred to hereafter as "the identified employees," which will be understood to mean the appropriate employee or the dual custody employees) have been identified, at step 310 or step 312, the identified employees may then be authorized to perform the employee activity, at step 314. For example, the authorization circuit 134 may be configured to automatically provide or allow various supervisory-level employees (e.g., branch managers, district managers) to provide authorization to the identified employees. As alluded to above, the authorization circuit 134 may authorize the identified employees by transmitting various appropriate authorization credentials to devices associated with the identified employees (e.g., the first employee device 106 and/or the second employee device 108). Accordingly, using the authorization credentials, the identified employees may be allowed to interact with and/or access required materials and/or information necessary for completion of the employee activity. The authorization credentials may include a one-time passcode or password, a digital key or token configured to be wirelessly transmitted from the employee's device to various devices associated with the requested employee activity, or any other suitable credential for authorizing the identified employees.

Accordingly, in addition or alternative to receiving, for example, a physical key (e.g., associated with a security deposit box) to provide access to an area of interest (e.g., a security deposit box), the identified employees may instead receive a virtual key on their respective devices (e.g., the first employee device 106 and/or the second employee device 108), which may be electronically used to access the area of interest (e.g., via a Bluetooth, near-field communication, or other secure proximity or network based communication technology). Thus, the employees may just carry (or wear if the employees' devices are wearable devices) their respective devices and use them to complete the employee activity.

After the identified employees have been authorized, at step 314, the identified employees may begin the employee activity, at step 316. Once the identified employees have begun the employee activity, at step 316, the identified employees may then be interactively monitored while performing the employee activity, at step 318. For example, the interactive monitoring circuit 132 may be configured to provide step-by-step instructions to the identified employees while they perform the employee activity. In some instances, the step-by-step instructions may be provided as an augmented reality overlay on an interactive interface provided by the employee client application 166 (e.g., the interactive interface 600 shown in FIG. 6). In some other instances, the step-by-step instructions may alternatively or additionally be provided via the various A/V outputs 152 in communication with the branch computing system 104 (e.g., via an audio or video stream provided by the A/V outputs 152).

Further, as the identified employees perform the employee activity, they may provide various indications to the interactive monitoring circuit 132 as they complete various tasks associated with the employee activity to mark the various tasks as complete. For example, in some instances, the identified employees may provide feedback via their respective devices (e.g., the first employee device 106 and/or the second employee device 108). In other instances, the identified employees may provide feedback via the various sensors 154 in communication with the branch computing system 104 (e.g., via an audio or video stream captured by the sensors 154). Accordingly, the interactive monitoring circuit 132 may be used to both provide instructions to the identified employees and receive feedback from the identified employees as they complete the associated tasks.

While interactively monitoring the identified employees performing the employee activity, at step 318, it may be determined whether any suspicious activity is occurring, at step 320. For example, as described in detail above, the interactive monitoring circuit 132 may be configured to automatically detect suspicious activities and/or allow various provider employees to view live-feeds of the identified employees performing the employee activity to detect suspicious activities.

For example, in some instances, the interactive monitoring circuit 132 may determine that suspicious activity has occurred if the identified employees have taken too long performing a given task associated with the employee activity. In some instances, the interactive monitoring circuit 132 may determine that suspicious activity has occurred if one or more the identified employees' physiological indicators (e.g., heart rate, body temperature) suddenly changes. For example, the sensors 154 in communication with the branch computing system 104 may be configured to monitor the identified employees' physiological indicators while they are performing the employee activity.

In some instances, the interactive monitoring circuit 132 may be configured to determine how many people are within a particular area of interest (e.g., a vault) pertaining to an employee activity. Accordingly, in some instances, the interactive monitoring circuit 132 may determine that suspicious activity has occurred if there are too many people or too few people within the area of interest while the identified employees are performing the employee activity.

In some instances, the interactive monitoring circuit 132 may determine that suspicious activity has occurred if the AI models of the interactive monitoring circuit 132 identifies that one or more of the identified employees has suspicious behavior. As alluded to above, the AI models of the interactive monitoring circuit 132 can be trained using various suspicious behavior indications over time provided by supervisory-level employees, historical training data including various past suspicious behavior indications, and/or using third-party suspicious behavior training data. In some instances, the interactive monitoring circuit 132 may additionally or alternatively utilize pre-trained AI models of external systems to detect suspicious activity via an API or other communication method.

If no suspicious activity is detected, at step 320, the identified employees may simply complete the employee activity, at step 322. Once the employee activity has been completed, at step 322, the employee ranking may be updated at step 324. For example, while the identified employees are being monitored throughout the performance of the employee activity, the interactive monitoring circuit 132 may determine that one or more of the identified employees has performed a ranking improvement action. The interactive monitoring circuit 132 may then be configured to communicate the ranking improvement action with the employee ranking circuit 130. In some instances, even if suspicious activity is not detected, at step 320, the interactive monitoring circuit 132 may still determine that one or more of the identified employees has performed a ranking decreasing action (e.g., taking too long). Accordingly, the interactive monitoring circuit 132 may similarly communicate the ranking decreasing action with the employee ranking circuit. The employee ranking circuit 130 may then increase or decrease the employee ranking accordingly.

If suspicious activity is detected, at step 320, the identified employees may have their authorization suspended or revoked, at step 326. For example, while the identified employees are being monitored throughout the performance of the employee activity, the interactive monitoring circuit 132 may determine that an action or behavior is suspicious and then provide an alert to the authorization circuit 134. In some instances, upon receiving the alert from the interactive monitoring circuit 132, the authorization circuit 134 may be configured to automatically revoke (e.g., de-authorize) the identified employees' authorizations. In some other instances, upon receiving the alert from the interactive monitoring circuit 132, the authorization circuit 134 may instead temporarily suspend the identified employees' authorizations.

In either case, the authorization circuit 134 may then send a notification to the provider computing system 102 and/or the branch computing system 104, at step 328, to alert a supervisory-level employee (e.g., a provider employee, a district manager, a branch manager) about the potentially suspicious activity. For example, in some instances, where the authorization circuit 134 has temporarily suspended the identified employees' authorization, the notification from the authorization circuit 134 may request validation of the suspicious activity from the supervisory-level employee. The supervisory-level employee may then review a recorded or live audio or video stream captured via the various sensors 154 of the branch computing system 104 while monitoring the identified employees to verify whether or not suspicious activity has actually occurred. If the supervisory-level employee confirms the suspicious activity, the authorization circuit 134 may then completely revoke (or de-authorize) the identified employees' authorizations. If the supervisory-level employee denies the suspicious activity (e.g., certifies or otherwise states that no suspicious activity has occurred), then the authorization circuit 134 may reinstate or reactivate the authorization of identified employees.

In some instances, upon detecting suspicious behavior and/or suspending the identified employees' authorizations, the interactive monitoring circuit 132 may allow for a supervisory-level employee to communicate with the identified employees to determine/verify why the system has flagged suspicious activity as having occurred. For example, the supervisory-level employee may ask the identified employees why the task is taking so long, why they are standing with a specific posture, why they are maintaining their backs to the camera, or any other pertinent questions relating to the flagged suspicious behavior. Accordingly, the supervisory-level employee may communicate directly with the identified employees to resolve any issues.

After the authorization circuit 134 has sent the notification to the provider computing system 102 and/or the branch computing system 104, at step 328, the employee ranking may similarly be updated, at step 324. For example, upon detecting the suspicious behavior, the interactive monitoring circuit 132 may determine that one or more of the identified employees has performed a ranking decreasing action. The interactive monitoring circuit 132 may then be configured to communicate the ranking decreasing action with the employee ranking circuit 130. Alternatively, if the supervisory-level employee denies the suspicious activity and one or more of the identified employees has performed a ranking improvement action, the interactive monitoring circuit 132 may then be configured to communicate the ranking improvement action with the employee ranking circuit 130. The employee ranking circuit 130 may then decrease or increase the employee ranking accordingly.

It should be appreciated that, in the case that the authorization of the identified employees is completely revoked (e.g., automatically or in response to the suspicious behavior being confirmed by the supervisory-level employee), the method 300 may return to step 310 or 312 and new employee(s) may be identified to perform the employee activity. Similarly, in the case that the authorization of the identified employees is temporarily suspended, and the supervisory-level employee denies the suspicious activity, the identified employees may resume the employee activity where they left off, and the method 300 may return to interactively monitoring the identified employees, at step 318.

Referring to FIG. 5, an interactive interface 500 provided by the branch client application 150 is shown on a mobile device 502 associated with the district manager or the branch manager. The interactive interface 500 may be used by the district manager or the branch manager to select various employees to perform a requested employee activity. In some instances, the mobile device 502 may be associated with and communicably coupled to the branch computing system 104. In some other instances, the branch computing system 104 may include or comprise the mobile device 502, such that the mobile device 502 is a part of the branch computing system 104. Accordingly, in some instances, various information can be pushed to and/or pulled from the mobile device 502 by the branch computing system 104. As such, the district manager or the branch manager may use the mobile device 502 to indicate which employees they would like to have perform a requested employee activity.

In some instances, the mobile device 502 may have video capturing capabilities (e.g., a smart phone having a video camera). As illustrated, the district manager or the branch manager may hold up the mobile device 502 and, upon capturing an image of the branch or other area where the employees are working, be provided with the interactive interface 500, which may provide an augmented reality overlay. For example, within the interactive interface 500, various employees 504 may be automatically identified, and the augmented reality overlay may provide various clickable employee links 506 for the district manager or the branch manager to use to select which employees they would like to have perform the requested employee activity. In some instances the clickable employee links 506 may include a name of the employee (shown as "Employee A," "Employee B," and "Employee C") and their corresponding employee ranking (shown as "20%," "80%," and "N/A"). As illustrated, in some instances, if an employee does not meet the requisite qualifications (e.g., training history, experience level), the employee may be given an employee ranking of "N/A" or "Not Applicable." In some instances, this employee may be grayed out or otherwise marked as non-selectable within the interactive interface 500.

In some instances, in the case that a dual custody activity is to be performed, the user (e.g., the branch manager or the district manager may further be presented with appropriate pairs of users via the interactive interface 500. For example, the user may be presented with the various employee rankings, as shown in FIG. 5, and, upon clicking on or otherwise selecting a first employee for the dual custody activity, the employee rankings may be replaced with an indicator showing which employees would make an appropriate pair with the first employee selected. For example, the indicator may be a pairing ranking that is similar to the employee ranking, as noted above.

In some instances, the interactive interface 500 may further include a virtual authorization key 508. Upon selection of the various employees 504, the district manager or the branch manager may further choose to provide a virtual authorization key 508 to certain employees 504. This may be done, for example, by sliding virtual authorization key 508 to the various employees 504 that the district manager or branch manager wishes to authorize for a given employee activity. In some instances, upon receipt of a virtual authorization key 508 on the identified employees' devices, the identified employees' devices may get a notification saying that they have received authorization and that the virtual authorization keys will be valid for a predetermined time period. The predetermined time period may be selected and/or updated by supervisory-level employees (e.g., provider employees, branch managers, district managers) via either of the provider client application 124 or the branch client application 150.

Figure 6:
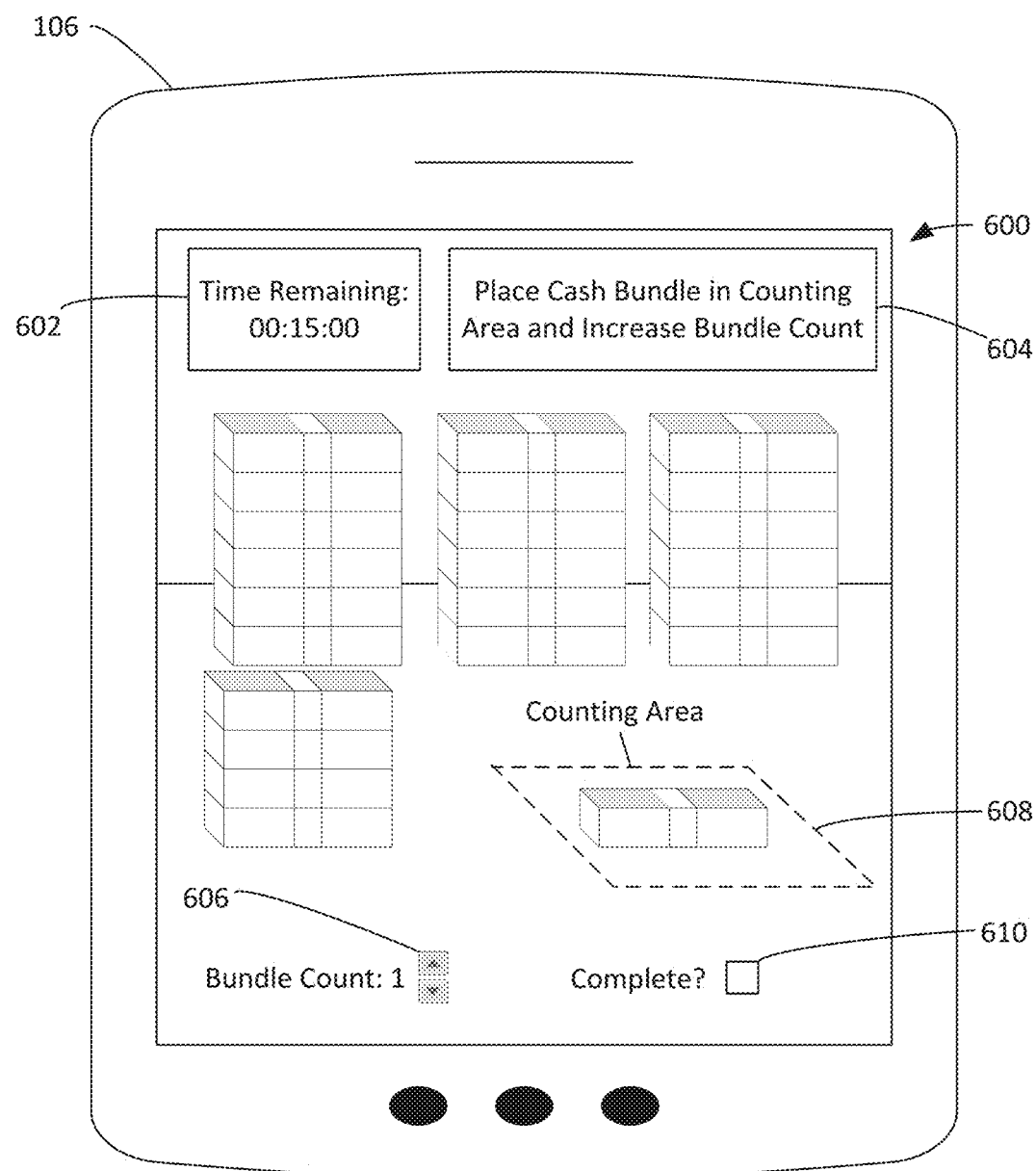
FIG. 6 is a user interface showing an interactive interface with an augmented reality overlay configured to provided step-by-step instructions to a selected employee while performing a given employee activity, according to an example embodiment.

Referring to FIG. 6, an interactive interface 600 provided by the employee client application 166 is shown on the first employee device 106. It will be understood that the same or a similar interface may also be provided on the second employee device 108 or any other device associated with an identified employee. The interactive interface 600 is configured to provide real-time instructions to the identified employee regarding how to perform the employee activity.

It will be understood that, although the interactive interface 600 is directed toward a cash counting activity, the system 100 is configured to provide a variety of interactive instructions for a variety of activities, and the concepts discussed pertaining to the interactive interface 600 may similarly be applied and/or adapted to suit virtually any employee activities that may be performed by the identified employee.

The interactive interface 600 includes a timer field 602, an instruction field 604, an updatable activity field 606, an overlaid area of interest 608, and a task completion field 610. The timer field 602 is configured to provide a real-time count down timer indicated how much time the identified employee has to complete the current task. For example, for the illustrated employee activity of cash counting, the identified employee may be given an initial amount of time of fifteen minutes to complete the task. It will be appreciated that various tasks may be allotted more or less time, as necessary, and as deemed appropriate by the procedural determination circuit 126.

The instruction field 604 is configured to display instruction on what the identified employee needs to do to complete the current task. For example, in the illustrated example, the instruction field 604 includes instructions for the identified employee to place a cash bundle in the overlaid area of interest 608 (shown in FIG. 6 as the "Counting Area") and to increase the bundle count (e.g., via the updatable activity field 606). The instruction field 604 may be configured to automatically update to include new instructions upon completion of a given task by the identified employee.

In the illustrated example shown in FIG. 6, the updatable activity field 606 comprises a bundle counter with interactive arrows usable to increase or decrease the current bundle count of cash bundles. However, the updatable activity field 606 may be modified, as necessary, depending on the task being performed by the identified employee. For example, in other instances, the updatable activity field 606 may comprise a different sort of updatable field or may be removed completely if it is deemed unnecessary for a given task.

In the illustrated example shown in FIG. 6, the overlaid area of interest 608 comprises a cash counting area. However, the overlaid area of interest 608 may similarly be modified, as necessary, depending on the task being performed by the identified employee. For example, in other instances, the overlaid area of interest 608 may instead indicate a particular safety deposit box for opening, a particular vault area to enter, or any other suitable area of interest pertaining to the employee activity. Further, in some instances, there may be a plurality of overlaid areas of interest 608 or no overlaid areas of interest 608, as necessary for a given task.

The task completion field 610 may allow for the user (e.g., the identified employee) to mark the current task complete. Accordingly, upon indicating that the current task is complete, the interactive interface 600 may update all of the various fields to correspond to a new task associated with the employee activity.

Further, in some instances, the interactive monitoring circuit 132 may be configured to monitor the identified employee performing the employee activity by viewing or otherwise monitoring the interactive interface 600, which may be live-streamed to the provider computing system 102 and/or the branch computing system 104. Accordingly, in some instances, supervisory-level employees (e.g., provider employees, branch managers, districts managers) may be able to simultaneously view the interactive interface 600 to see exactly what the identified employee is viewing and to communicate in real-time with the identified employee to provide additional instructions and/or clarifications on the various tasks being performed.

Regarding FIGS. 5 and 6 generally, those of skill in the art will appreciate that FIGS. 5 and 6 are meant to be illustrative, rather than limiting. For example, in other embodiments, the interfaces (e.g., including the augmented reality overlays) are configured differently, such as including different entry boxes, different notifications, a different order, a different arrangement, or different options generally.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form in of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A secure activity management system comprising:
   a network;
   an employee device associated with an employee of a provider;
   one or more sensors comprising one or more of an accelerometer, a camera, or a physiological sensor; and
   a provider computing system associated with the provider and configured to communicate with the employee device via the network, the provider computing system comprising a processing circuit including a processor and a memory, the processing circuit structured to:
      receive an activity initiation trigger including an employee activity indicator;
      determine a dual custody activity based on the employee activity indicator;
      identify a task for completion of the dual custody activity;
      identify the employee to perform the task based on an employee ranking of the employee;
      authorize the employee to perform the task;
      monitor the employee while the employee performs the task, wherein monitoring the employee comprises:
         providing real-time instructions to the employee device associated with the employee while the employee performs the task, the real-time instructions being provided to the employee device via an augmented reality overlay to be displayed on the employee device; and
         receiving, via the one or more sensors, monitoring information pertaining to the employee performing the task while the employee performs the task;
      detect, based on the monitoring information and an artificial intelligence (AI) model, that suspicious activity has occurred while the employee is performing the task, wherein the suspicious activity comprises at least one of a sudden change in a physiological indicator or a posture of the employee indicative of a hidden object; and
      train the AI model based on verified suspicious activities.

2. The secure activity management system of claim 1, wherein the monitoring information comprises at least one of audio data, video data, physiological data, or thermal imaging data.

3. The secure activity management system of claim 1, further comprising:
   a supervising employee device associated with a supervising employee of the provider, and wherein the processing circuit is further structured to:
      upon detecting that the suspicious activity has occurred, provide an alert to the supervising employee regarding the suspicious activity via the supervising employee device.

4. The secure activity management system of claim 1, wherein the processing circuit is further structured to:
   upon detecting that the suspicious activity has occurred, at least one of revoke the employee's authorization or temporarily suspend the employee's authorization.

5. The secure activity management system of claim 1, wherein the processing circuit is further structured to:
   update the employee ranking corresponding to the employee based on performance of the task by the employee.

6. The secure activity management system of claim 1, wherein the AI model is configured to continuously learn from at least one of live instructions or feedback provided by an entity associated with the provider computing system.

7. The secure activity management system of claim 1, wherein the one or more sensors comprise a plurality of sensors and the one or more of the accelerometer, the camera, or the physiological sensor comprises two or more of the accelerometer, the camera, or the physiological sensor.

8. A secure activity management system comprising:
a network;
an employee device associated with an employee of a provider;
one or more sensors comprising one or more of an accelerometer, a camera, or a physiological sensor; and
a provider computing system associated with the provider and configured to communicate with the employee device via the network, the provider computing system comprising a processing circuit including a processor and a memory, the processing circuit structured to:
receive an activity initiation trigger including an employee activity indicator;
determine an employee activity based on the employee activity indicator;
identify a task for completion of the employee activity;
identify the employee to perform the task based on an employee ranking of the employee;
authorize the employee to perform the task;
monitor the employee while the employee performs the task, wherein monitoring the employee comprises:
providing real-time instructions to the employee device via an augmented reality (AR) overlay to be displayed on the employee device while the employee performs the task; and
receiving, via the one or more sensors, monitoring information pertaining to the employee performing the task while the employee performs the task;
detect, based on the monitoring information and an artificial intelligence (AI) model, that suspicious activity has occurred while the employee is performing the task, wherein the suspicious activity comprises at least one of a sudden change in a physiological indicator or a posture of the employee indicative of a hidden object; and
train the AI model based on verified suspicious activities.

9. The secure activity management system of claim 8, wherein the monitoring information comprises at least one of audio data, video data, physiological data, or thermal imaging data.

10. The secure activity management system of claim 8, further comprising:
a supervising employee device associated with a supervising employee of the provider, and
wherein the processing circuit is further structured to:
upon detecting that the suspicious activity has occurred, providing an alert to the supervising employee regarding the suspicious activity via the supervising employee device.

11. The secure activity management system of claim 10, wherein the processing circuit is further structured to:
upon detecting that the suspicious activity has occurred, at least one of revoke the employee's authorization or temporarily suspend the employee's authorization.

12. The secure activity management system of claim 8, wherein the AI model is configured to continuously learn from at least one of live instructions or feedback provided by an entity associated with the provider computing system.

13. The secure activity management system of claim 8, wherein the one or more sensors comprise a plurality of sensors and the one or more of the accelerometer, the camera, or the physiological sensor comprise two or more of the accelerometer, the camera, or the physiological sensor.

14. A secure activity management system comprising:
a network;
an employee device associated with an employee of a provider;
a plurality of sensors comprising two or more of an accelerometer, a camera, or a physiological sensor; and
a provider computing system associated with the provider and configured to communicate with the employee device via the network, the provider computing system comprising a processing circuit including a processor and a memory, the processing circuit structured to:
receive an activity initiation trigger including an employee activity indicator;
determine a dual custody activity based on the employee activity indicator;
identify a task for completion of the dual custody activity;
identify the employee to perform the task based on an employee ranking of the employee;
authorize the employee to perform the task;
monitor the employee while the employee performs the task, wherein monitoring the employee comprises:
providing real-time instructions to the employee device associated with the employee while the employee performs the task; and
receiving, via the plurality of sensors, monitoring information pertaining to the employee performing the task while the employee performs the task;
detect, based on the monitoring information and an artificial intelligence (AI) model, that suspicious activity has occurred while the employee is performing the task, wherein the suspicious activity comprises at least one of a sudden change in a physiological indicator or a posture of the employee indicative of a hidden object; and
train the AI model based on verified suspicious activities.

15. The secure activity management system of claim 14, wherein the monitoring information comprises at least one of audio data, video data, physiological data, or thermal imaging data.

16. The secure activity management system of claim 14, further comprising:
a supervising employee device associated with a supervising employee of the provider, and wherein the processing circuit is further structured to:
upon detecting that the suspicious activity has occurred, provide an alert to the supervising employee regarding the suspicious activity via the supervising employee device.

17. The secure activity management system of claim 14, wherein the processing circuit is further structured to:
upon detecting that the suspicious activity has occurred, at least one of revoke the employee's authorization or temporarily suspend the employee's authorization.

18. The secure activity management system of claim 14, wherein the real-time instructions are provided to the employee device via an augmented reality overlay to be displayed on the employee device.

19. The secure activity management system of claim 14, wherein the processing circuit is further structured to:
   update the employee ranking corresponding to the employee based on performance of the task by the employee.

* * * * *